United States Patent
Lai et al.

(10) Patent No.: US 8,884,568 B2
(45) Date of Patent: Nov. 11, 2014

(54) DRIVING CIRCUIT AND METHOD FOR FAN

(71) Applicant: Anpec Electronics Corporation, Hsin-Chu (TW)

(72) Inventors: Ching-Feng Lai, Taipei (TW); Hung-Chun Yeh, Hsinchu (TW); Kang Sheng, Taoyuan County (TW)

(73) Assignee: Anpec Electronics Corporation, Hsinchu Science Park, Hsin-Chu (TW)

( * ) Notice: Subject to any disclaimer, the term of this patent is extended or adjusted under 35 U.S.C. 154(b) by 197 days.

(21) Appl. No.: 13/663,453

(22) Filed: Oct. 29, 2012

(65) Prior Publication Data
US 2014/0021899 A1     Jan. 23, 2014

(30) Foreign Application Priority Data
Jul. 17, 2012 (TW) .............................. 101125681 A

(51) Int. Cl.
*G05B 5/00* (2006.01)

(52) U.S. Cl.
USPC .................. 318/445; 318/400.08; 318/400.22

(58) Field of Classification Search
USPC ................ 318/445, 400.08, 400.22, 806, 782
See application file for complete search history.

(56) References Cited

U.S. PATENT DOCUMENTS

2010/0298983 A1* 11/2010 Beste et al. .................... 700/276
2012/0204715 A1* 8/2012 Hagan ............................. 95/26

FOREIGN PATENT DOCUMENTS

| CN | 1417926 A | 5/2003 |
| CN | 102541083 A | 7/2012 |
| TW | 200631302 | 9/2006 |
| TW | 200737687 | 10/2007 |
| TW | 200838141 | 9/2008 |
| TW | 200845560 | 11/2008 |

* cited by examiner

*Primary Examiner* — Karen Masih
(74) *Attorney, Agent, or Firm* — Winston Hsu; Scott Margo

(57) ABSTRACT

A driving circuit for driving a fan with a plurality of operational modes includes an initiation module for generating a switch signal according to a feedback signal, a control module coupled to the initiation module for utilizing a pulse frequency modulation technique to generate a control signal according to the switch signal and a predetermined comparison signal, so as to drive the fan for a rotational operation, and a feedback module coupled to the fan for generating the feedback signal according to a conduction result of the fan. The rotational operation includes the plurality of operational modes, and the fan is switched between the plurality of operational modes according to different conduction results of the fan.

22 Claims, 9 Drawing Sheets

DRIVING CIRCUIT AND METHOD FOR FAN

BACKGROUND OF THE INVENTION

1. Field of the Invention

The present invention relates to a driving circuit and method for a fan, and more particularly, to a driving circuit and method utilizing a pulse frequency modulation technique to operate the fan with a plurality of operational modes.

2. Description of the Prior Art

A motor is an electronic device for transferring electrical energy into dynamic energy, such as a DC motor, an AC motor or a stepper motor, etc. The DC motor is frequently utilized in non-sophisticated control devices, such as a fan. Generally, the DC motor rotates based on a current passing through coils of a stator of the DC motor to generate different amounts or polarized directions of magnetic force to attract or repel a permanent magnet on a rotor of the DC motor to make the motor rotate.

Please refer to FIG. 1, which illustrates a schematic diagram of a conventional motor driving circuit 10. As shown in FIG. 1, the motor driving circuit 10 utilizes a linear voltage driving process to correspondingly drive a fan 12 for rotation. The motor driving circuit 10 receives an input voltage source VIN, and a voltage drop is correspondingly generated to render an output voltage VOUT to the fan 12, wherein the voltage drop is a difference between the input voltage source VIN and the output voltage VOUT. Please refer to FIG. 2, which illustrates a schematic diagram of temperature values versus rotational speeds of the motor driving circuit 10 shown in FIG. 1, wherein the motor driving circuit 10 is an electrical chip circuit labeled GR8030, the X-axis represents the surrounding temperature values of the fan 12 (or via realization as a conduction voltage/current of the fan 12), and the Y-axis represents relative rotational speeds of the fan 12 (i.e. a percentage of the maximum rotational speed of the fan 12). As shown in FIG. 2, while a user initiates the motor driving circuit 10, the temperature value of the fan 12 is a lower value and the motor driving circuit 10 drives the fan 12 with a larger initial rotational speed. For example, the fan 12, as shown in FIG. 2, increases the rotational speed from 60% maximum rotational speed to 80% maximum rotational speed, and returns to 10% maximum rotational speed after waiting a predetermined period. Under such circumstances, the fan 12 maintains the 10% maximum rotational speed as a minimum rotational speed without changes. When the fan 12 is operated with an increased temperature value such as 30 degrees, the motor driving circuit 10 may correspondingly increase the relative rotational speed of the fan 12. Preferably, increases of the relative rotational speed and increases of the driving voltage form a linear relationship, which means that when the surrounding temperature value of the fan 12 is a larger value, the relative rotational speed of the fan 12 is faster, such that the fan 12 can effectively eliminate heat generation while being operated. When the surrounding temperature value of the fan 12 continuously increases to 100 degrees, the fan 12 may be operated with the maximum rotational speed. In that, when the fan 12 is operated with the maximum rotational speed for a while and the temperature value continuously increases to a predetermined maximum temperature as 115 degrees without reduction, the motor driving circuit 10 may determine the fan 12 as being overheated, i.e. an electronic system comprising the fan 12 may be overloaded, such that the motor driving circuit 10 may process an overheated protection mechanism for the fan 12. However, the prior art merely adjusts the input voltage VIN for linear increasing/decreasing the driving voltage to correspondingly increase/decrease the rotational speed of the fan 12, and lacks of flexibility to adjust the rotational speed of the fan 12 via other operations or control signals, so as to adaptively apply the fan 12 into different environmental conditions to meet specific requirements. Thus, the application of the motor driving circuit 10 can be limited.

Therefore, it has become an important issue to provide a driving circuit and method for a fan via different operational modes, so as to comply with different environmental conditions and particular requirements.

SUMMARY OF THE INVENTION

It is therefore an objective of the invention to provide a driving circuit and method for a fan being operated in different operational modes, so as to comply with different environmental conditions and particular requirements.

The present invention discloses a driving circuit for driving a fan with a plurality of operational modes comprising an initiation module for generating a switch signal according to a feedback signal; a control module coupled to the initiation module for utilizing a pulse frequency modulation technique to generate a control signal according to the switch signal and a predetermined comparison signal, so as to drive the fan for a rotational operation; and a feedback module coupled to the fan for generating the feedback signal according to a conduction result of the fan; wherein the rotational operation comprises the plurality of operational modes, and the fan is switched between the plurality of operational modes according to different conduction results of the fan.

The present invention discloses another method for utilizing a driving circuit to drive a fan with a plurality of operational modes comprising generating a switch signal according to a feedback signal; utilizing a pulse frequency modulation technique to generate a control signal according to the switch signal and a predetermined comparison signal, so as to drive the fan for a rotational operation; and generating the feedback signal according to a conduction result of the fan; wherein the rotational operation comprises the plurality of operational modes, and the fan is switched between the plurality of operational modes according to different conduction results of the fan.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
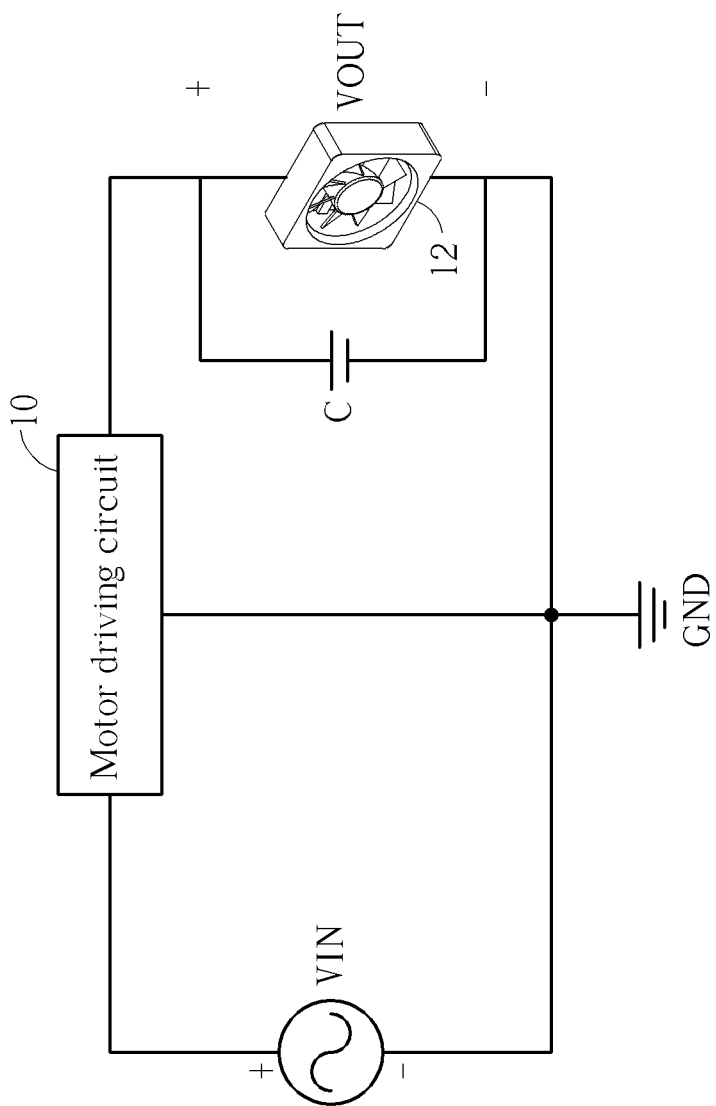
FIG. 1 illustrates a conventional schematic diagram of a conventional motor driving circuit.
Figure 2:
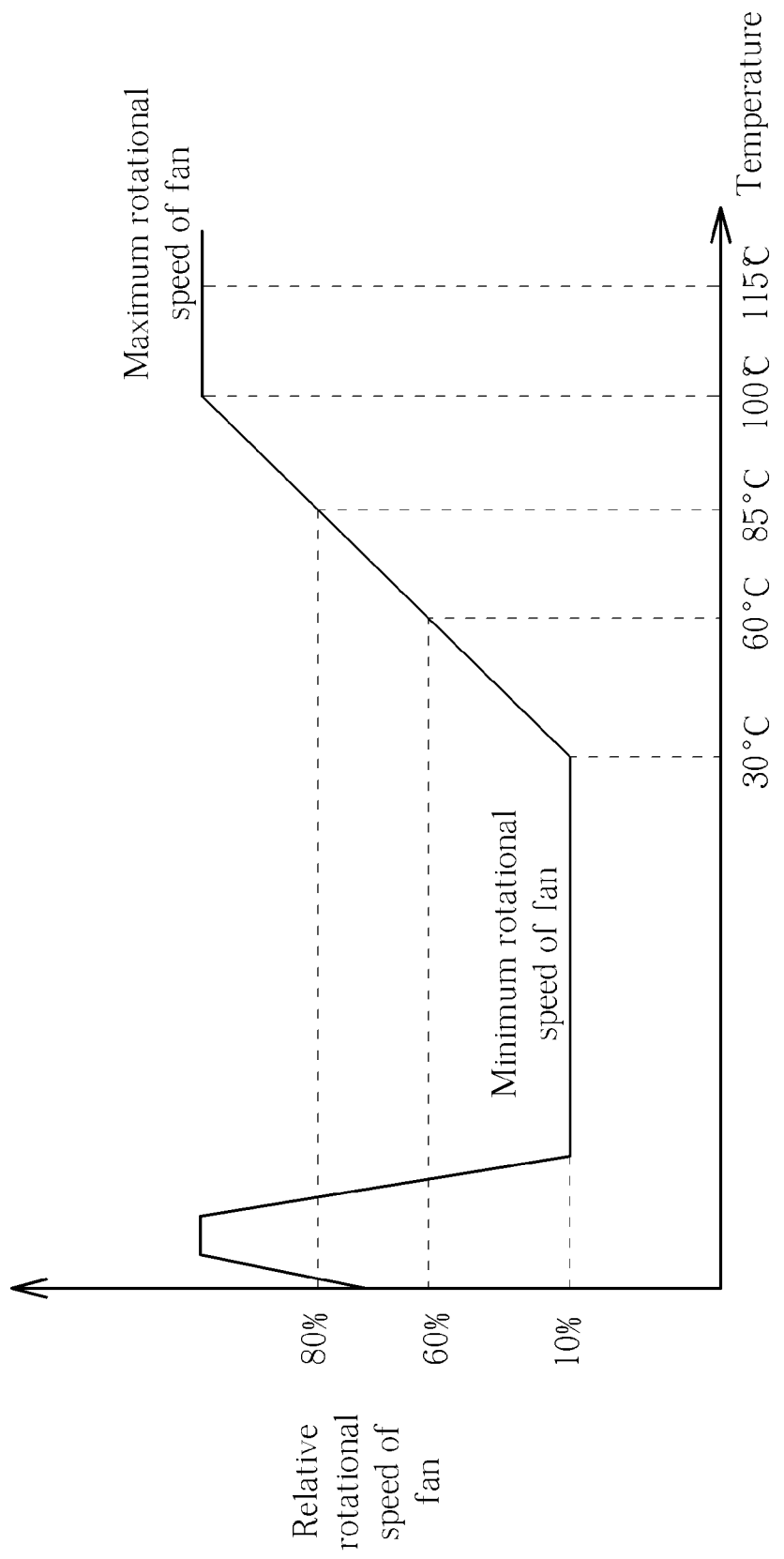
FIG. 2 illustrates a conventional schematic diagram of temperature values versus rotational speeds of the motor driving circuit shown in FIG. 1.
Figure 3:
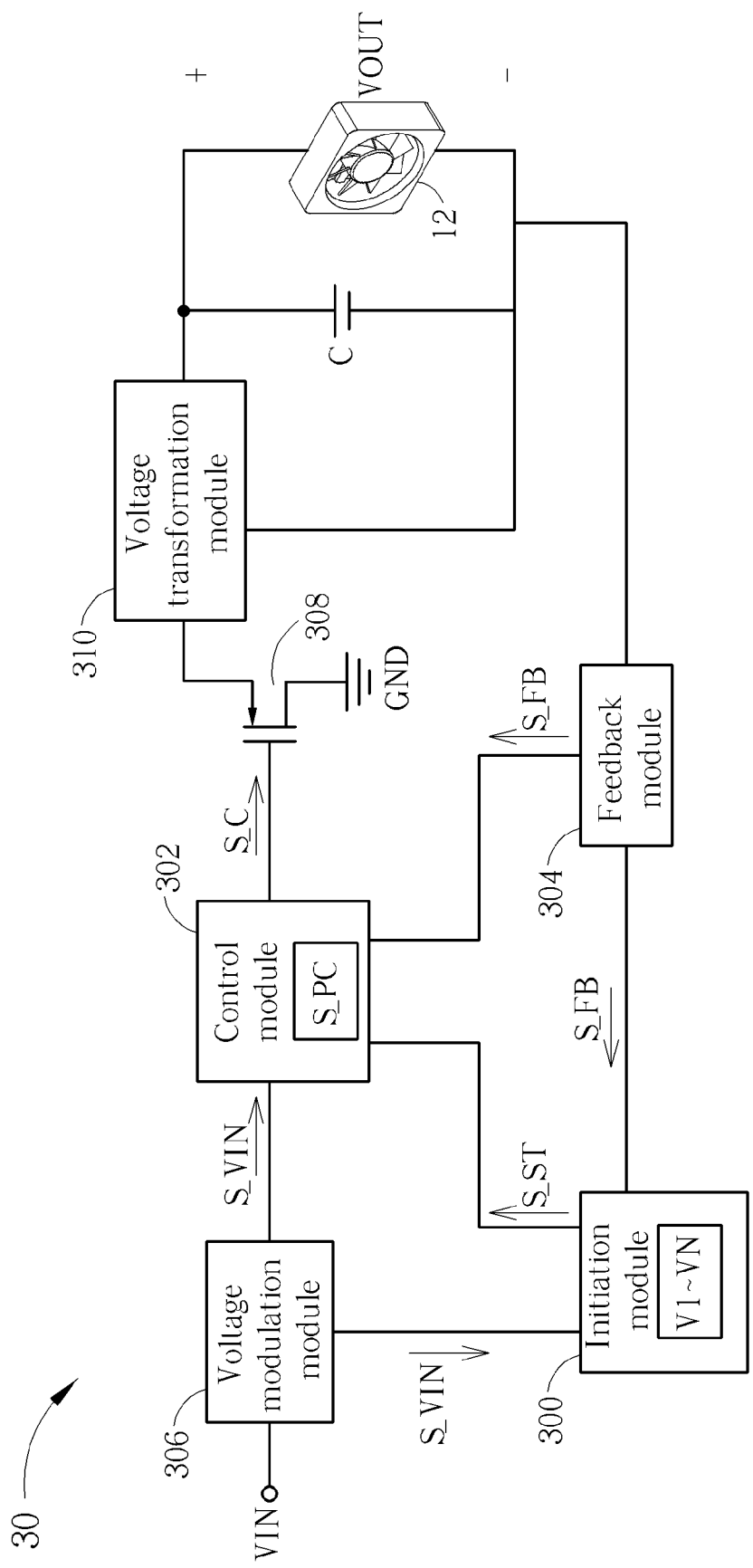
FIG. 3 illustrates a schematic diagram of a driving circuit according to an embodiment of the invention.

Please refer to FIG. 3, which illustrates a schematic diagram of a driving circuit 30 according to an embodiment of the invention, wherein a control module 302 of the driving circuit 30 utilizes the pulse frequency modulation (PFM) technique for correspondingly generating a transformed output voltage VOUT and an initiation module 300 pre-stores a plurality of driving voltage values V1-VN, so as to process a rotational operation for the fan 12. As shown in FIG. 3, the driving circuit 30 not only comprises the initiation module 300 and the control module 302, but also comprises a feedback module 304, a voltage modulation module 306, a switch transistor 308 and a voltage transformation module 310. The driving circuit 30 utilizes the voltage modulation module 306 to receive an input voltage VIN to generate a modulation input voltage S_VIN to the initiation module 300 and the control module 302. The initiation module 300 is coupled to the feedback module 304 to generate a switch signal S_ST according differences between a feedback signal S_FB generated by the feedback module 304 and the plurality of driving voltage values V1-VN. The control module 302 pre-stores a predetermined comparison signal S_PC to compare a difference between the predetermined comparison signal S_PC and the feedback signal S_FB according to the switch signal S_ST and the modulation input voltage S_VIN, so as to output a control signal S_C. The switch transistor 308 is turned on/off according to the control signal S_C. The voltage transformation module 310 outputs the output voltage VOUT to the fan 12 and a stabilization capacitor C according to a conduction condition of the switch transistor 308, so as to drive the fan 12 for the rotational operation. In the meanwhile, the feedback module 304 correspondingly generates the feedback signal S_FB according to a conduction result of the fan 12, so as to dynamically process the operation of the initiation module 300 and the control module 302.

In the embodiment, the conduction result of the fan 12 can be realized via a voltage type or a current type, and both can be replaced with each other via Ohm's Law. If the conduction result of the fan 12 corresponds to a smaller value of the voltage (current) type, the fan 12 corresponds to a higher temperature value. On the other hand, if the conduction result of the fan 12 corresponds to a larger value of the voltage (current) type, the fan 12 corresponds to a smaller temperature value. Accordingly, the user can set up a relationship between the temperature value (i.e. the conduction voltage/current of the fan 12) and the rotational speed of the fan 12 according to the conduction result of the fan 12, so as to render the relationship for the following operation.

Figure 4:
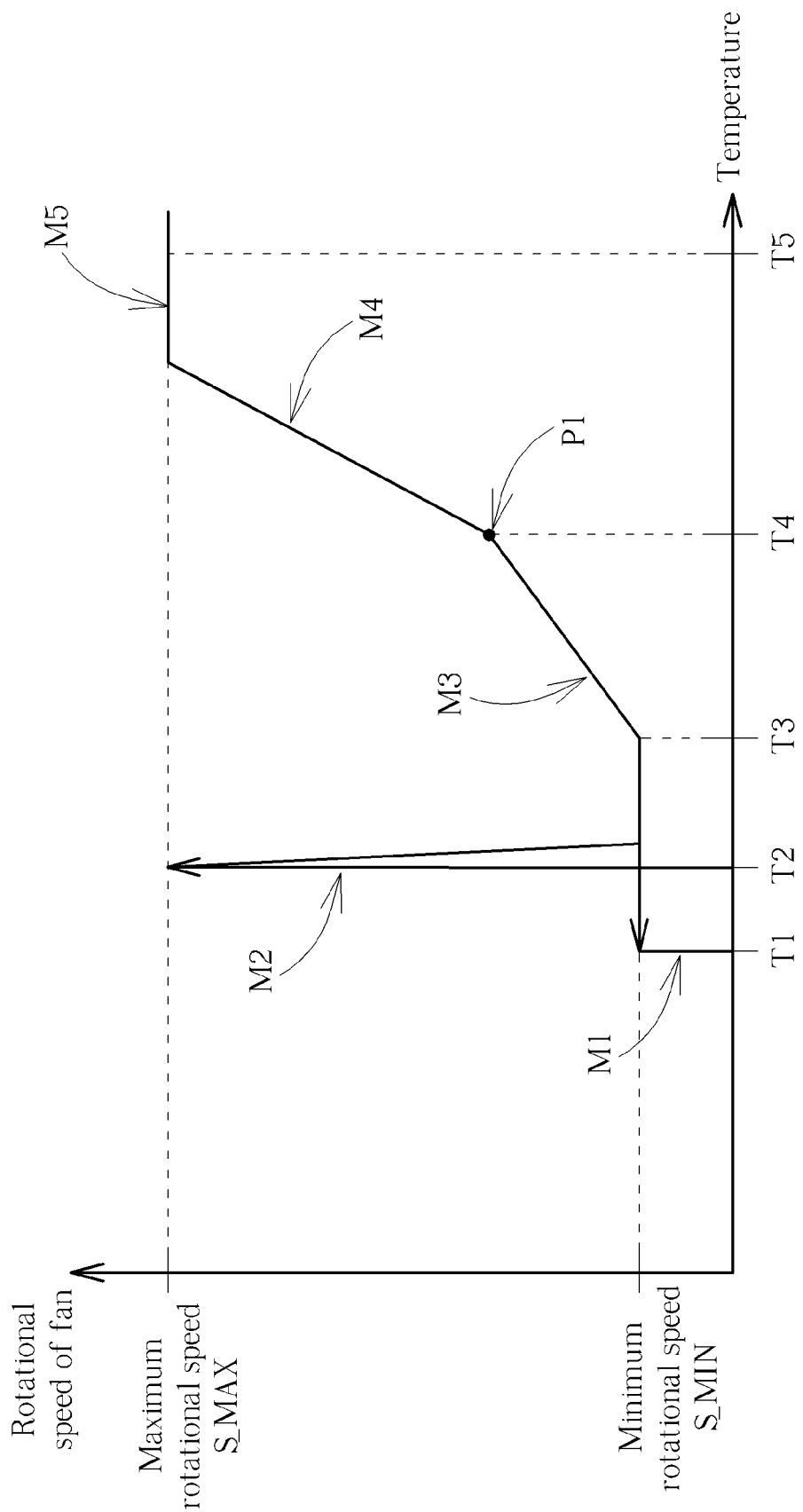
FIG. 4 illustrates a schematic diagram of temperature values versus rotational speeds of the motor driving circuit shown in FIG. 3 to drive the fan with a plurality of operational modes according to an embodiment of the invention.

Please refer to FIG. 4, which illustrates a schematic diagram of temperature values versus rotational speeds of the motor driving circuit 30 shown in FIG. 3 to drive the fan 12 with a plurality of operational modes according to an embodiment of the invention. As shown in FIG. 4, referring to the mentioned relationship between the temperature value (or the conduction voltage/current) and the rotational speed, the initiation module 300 of the driving circuit 30 pre-stores the driving voltage values V1-VN to be reference temperature values T1-T5, so as to correspond to the operational modes M1-M5. The reference temperature values T1-T5 are realized via a voltage/current type, and the operational modes are a sleeping mode M1, an initiation mode M2, a first driving mode M3, a second driving mode M4 and a high temperature protection mode M5. The sleeping mode M1 is utilized for saving the power consumption of the driving circuit 30. The initiation mode M2 is utilized for initiating the driving circuit 30. The first driving mode M3 is utilized for rotating the fan 12 with a first rotational speed. The second driving mode M4 is utilized for rotating the fan 12 with a second rotational speed, and the second rotational speed is faster than the first rotational speed, e.g. the first rotational speed is 600 RPM (revolution per minute) and the second rotational speed is 900 RPM. The high temperature protection mode M5 is utilized to prevent a peripheral system comprising the fan 12 from overloading and being overheated and damaged.

Preferably, while the driving circuit 30 outputs the incremental output voltage VOUT, the temperature of the fan 12 increases as well. Under such circumstances, when the embodiment of the invention detects the current temperature value of the fan 12 matching one of the reference temperature values T1-T5, the initiation module 300 may generate the switch signal S_ST to switch the fan 12 to be operated in one of the operational modes M1-M5, so as to adaptively adjust the rotational speed of the fan 12, wherein the rotational speed of the fan 12 is in the range between a minimum rotational speed S_MIN and a maximum rotational speed S_MAX. In the embodiment, the first driving mode M3 and the second driving mode M4 further comprise a turning point P1 for adjusting the fan 12 with different rotational speeds (e.g. the first rotational speed and the second rotational speed). Thus, those skilled in the art can adaptively adjust amounts of the reference temperature value T4 or provide a plurality of turning points to be inserted between the first driving mode M3 and the second driving mode M4 (i.e. inserting more reference temperature values) according to different requirements, so as to provide more slopes corresponding to more rotational speeds for the fan 12, which is also in the scope of the invention.

Figure 5:
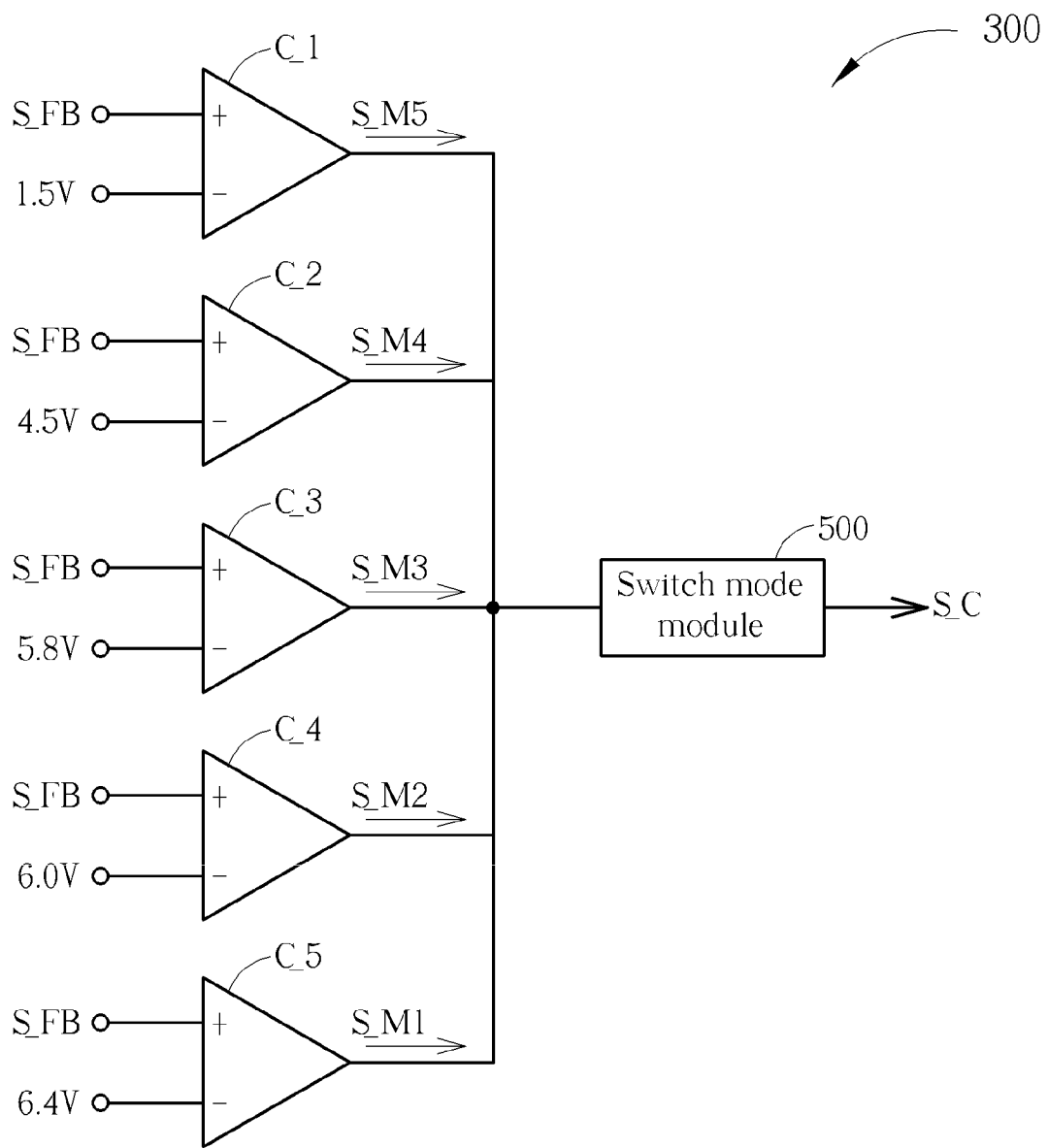
FIG. 5 illustrates a detailed realization circuit diagram of the initiation module shown in FIG. 3 according to an embodiment of the invention.

Please refer to FIG. 5, which illustrates a detailed realization circuit diagram of the initiation module 300 shown in FIG. 3 according to an embodiment of the invention. As shown in FIG. 5, the initiation module 300 comprises five comparators C_1-C_5 pre-storing the reference voltage values as 1.5 volts, 4.5 volts, 5.8 volts, 6.0 volts and 6.4 volts, respectively. By comparing the differences between the feedback signal S_FB and the above reference voltage values, the initiation module 300 correspondingly outputs the switch mode signals S_M5, S_M4, S_M3, S_M2 or S_M1 to operate the fan 12 in the operational modes M5, M4, M3, M2 or M1, respectively. Lastly, a switch mode module 500 correspondingly outputs the switch signal S_ST. The numbers of the comparators as well as the amounts of the reference voltage values are demonstrated hereinafter for simple explanation, and those skilled in the art can adaptively modify/change the mentioned conditions to operate the fan 12 with a plurality of incremental reference voltage values corresponding to more operational modes, which is also in the scope of the invention. Besides, the switch mode module 500 of the invention can be realized via combining a plurality of logical circuits as well as a plurality of switch transistors, so as to correspondingly output the switch signal S_ST according to the comparison results of the comparators C_1-C_5 and to control the conduction condition of the switch transistor 308.

Please refer to FIG. 3 again. The control module 302 of the driving circuit 30 utilizes the PFM technique and pre-stores the predetermined comparison signal S_PC. Further, the control module 302 compares the difference between the predetermined comparison signal S_PC and the feedback signal S_FB to generate the control signal S_C for correspondingly controlling the rotational operation of the fan 12. Noticeably, the predetermined comparison signal S_PC can be realized as a limitation current signal S_CL or a constant timing signal S_FT. Also, the limitation current signal S_CL and the constant timing signal S_FT can be realized via a current (voltage) type to be pre-stored in a comparator for the determination of the control module 302 utilizing the PFM technique. Preferably, the constant timing signal S_FT can be classified into a constant turning-on timing signal S_FXON and a constant turning-off timing signal S_FXOFF, so as to control when the control module 302 is to be initiated or terminated. Besides, the PFM technique compares the difference between the feedback signal S_FB (i.e. the conduction condition of the fan 12) and the predetermined comparison signal S_PC (i.e. the limitation current signal S_CL or the constant timing signal S_FT) within a constant period to determine how much the energy passes through the fan 12, so as to determine whether or not to increase/decrease the energy passing through the fan 12. Under such circumstances, the user can adaptively pre-store the limitation current signal S_CL, the constant turning-on timing signal S_FXON or the constant turning-off timing signal S_FXOFF in the control module 302, and the control module 302 may process the comparison between the feedback signal S_FB as well as the limitation current signal S_CL, the constant turning-on timing signal S_FXON and the constant turning-off timing signal S_FXOFF. Next, the control module 302 may wait for a while to see whether the feedback signal S_FB matches the limitation current signal S_CL, or whether the feedback signal S_FB matches one of the constant turning-on timing signal S_FXON and the constant turning-off timing signal S_FXOFF, and correspondingly outputs the control signal S_C while the feedback signal S_FB matches either one of the above situations. Certainly, those skilled in the art can modify the above signals to form different combinations for the comparison mechanism, so as to accurately determine how much the energy passes through the fan 12, which is also in the scope of the invention.

Figure 6:
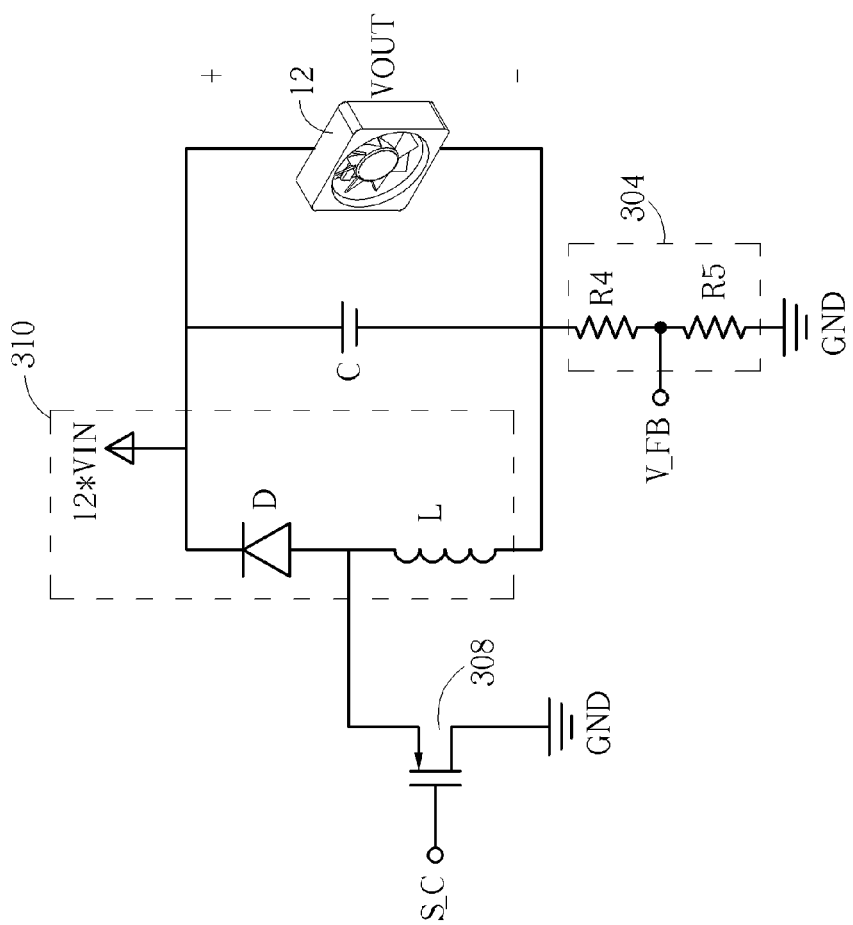
FIG. 6 illustrates a detailed schematic diagram of the voltage transformation module and the feedback module shown in FIG. 3 according to an embodiment of the invention.

Please refer to FIG. 6, which illustrates a detailed schematic diagram of the voltage transformation module 310 and the feedback module 304 shown in FIG. 3 according to an embodiment of the invention. As shown in FIG. 6, the voltage transformation module 310 is a bootstrap circuit to be realized via a stable voltage source 12*VIN, a diode D and an inductor L. After the switch transistor 308 is conducted, the voltage transformation module 310 outputs different output voltages to drive the fan 12 with different rotational speeds. Certainly, those skilled in the art can design/modify the voltage transformation module 310 to be other types of buck converters or boost converters, so as to provide the fan 12 with a non-linear transformed output voltage, which is also in the scope of the invention. Additionally, the feedback module 304 is realized via division voltage resistors R4, R5, so as to generate different feedback signals according to different output voltages. Besides, the voltage modulation module 306 is utilized to transform the input voltage VIN into the modulation input voltage S_VIN, so as to provide a flexible value of the modulation input voltage S_VIN to drive the initiation module 300 and control module 302, respectively. The realization of the voltage modulation module 306 should be well known to those skilled in the art, and is not described hereinafter.

Figure 7:
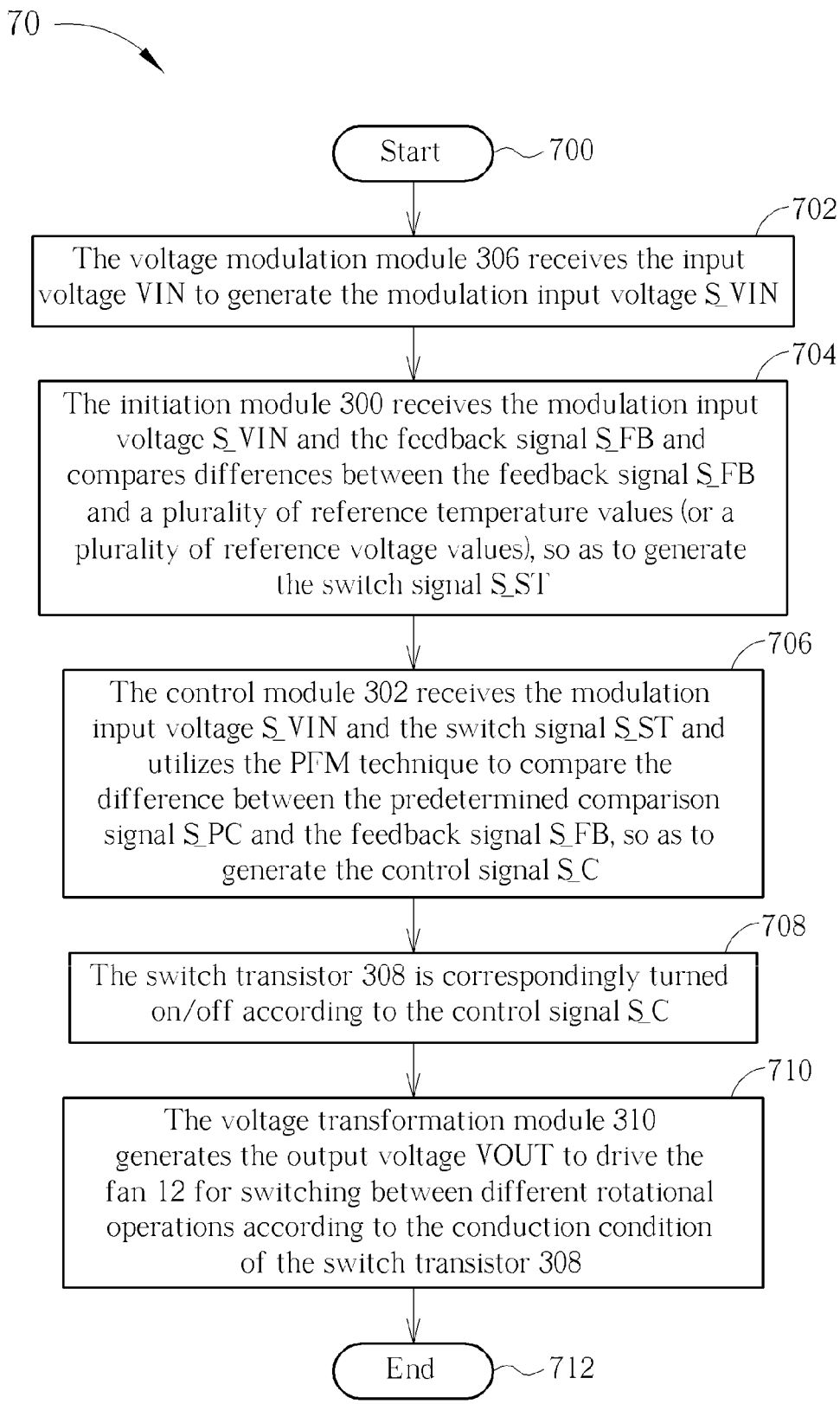
FIG. 7 illustrates a flow chart of a driving process according to an embodiment of the invention.

Further, the mentioned driving operation applied to the driving circuit 30 can be summarized as a driving process 70, as shown in FIG. 7. The driving process 70 includes the steps as follows.

Step 700: Start.

Step 702: The voltage modulation module 306 receives the input voltage VIN to generate the modulation input voltage S_VIN.

Step 704: The initiation module 300 receives the modulation input voltage S_VIN and the feedback signal S_FB and compares differences between the feedback signal S_FB and a plurality of reference temperature values (or a plurality of reference voltage values), so as to generate the switch signal S_ST.

Step 706: The control module 302 receives the modulation input voltage S_VIN and the switch signal S_ST and utilizes the PFM technique to compare the difference between the predetermined comparison signal S_PC and the feedback signal S_FB, so as to generate the control signal S_C.

Step 708: The switch transistor 308 is correspondingly turned on/off according to the control signal S_C.

Step 710: The voltage transformation module 310 generates the output voltage VOUT to drive the fan 12 for switching between different rotational operations according to the conduction condition of the switch transistor 308.

Step 712: End

The detailed operation of the driving process 70 can be understood from the driving circuit 30, FIG. 3 to FIG. 6 and related paragraphs thereof, which is not described hereinafter. Noticeably, those skilled in the art can adaptively add/modify the numbers and amounts of the plurality of predetermined reference temperature values (or the plurality of reference voltage values) mentioned in Step 704 to generate the switch signal S_ST, and more determination mechanisms can also be added to provide more operational modes, which is also in the scope of the invention. Further, those skilled in the art can add/modify the predetermined comparison signal S_PC mentioned in step 706, such as the limitation current signal S_CL, the constant turning-on timing signal S_FXON and the constant turning-off timing signal S_FXOFF, so as to provide the combination/modification signals for the control module 302 to process the PFM technique. Thus, the energy passing through the fan 12 can be adaptively adjusted to generate the non-linear transformed driving voltage to dynamically switch the fan 12 between the plurality of operational modes. Under such circumstances, the driving process 70 applied to the driving circuit 30 can comply with different users' requirements or different loading conditions, so as to be applied to a larger application field with better energy conversion efficiency.

Figure 8:
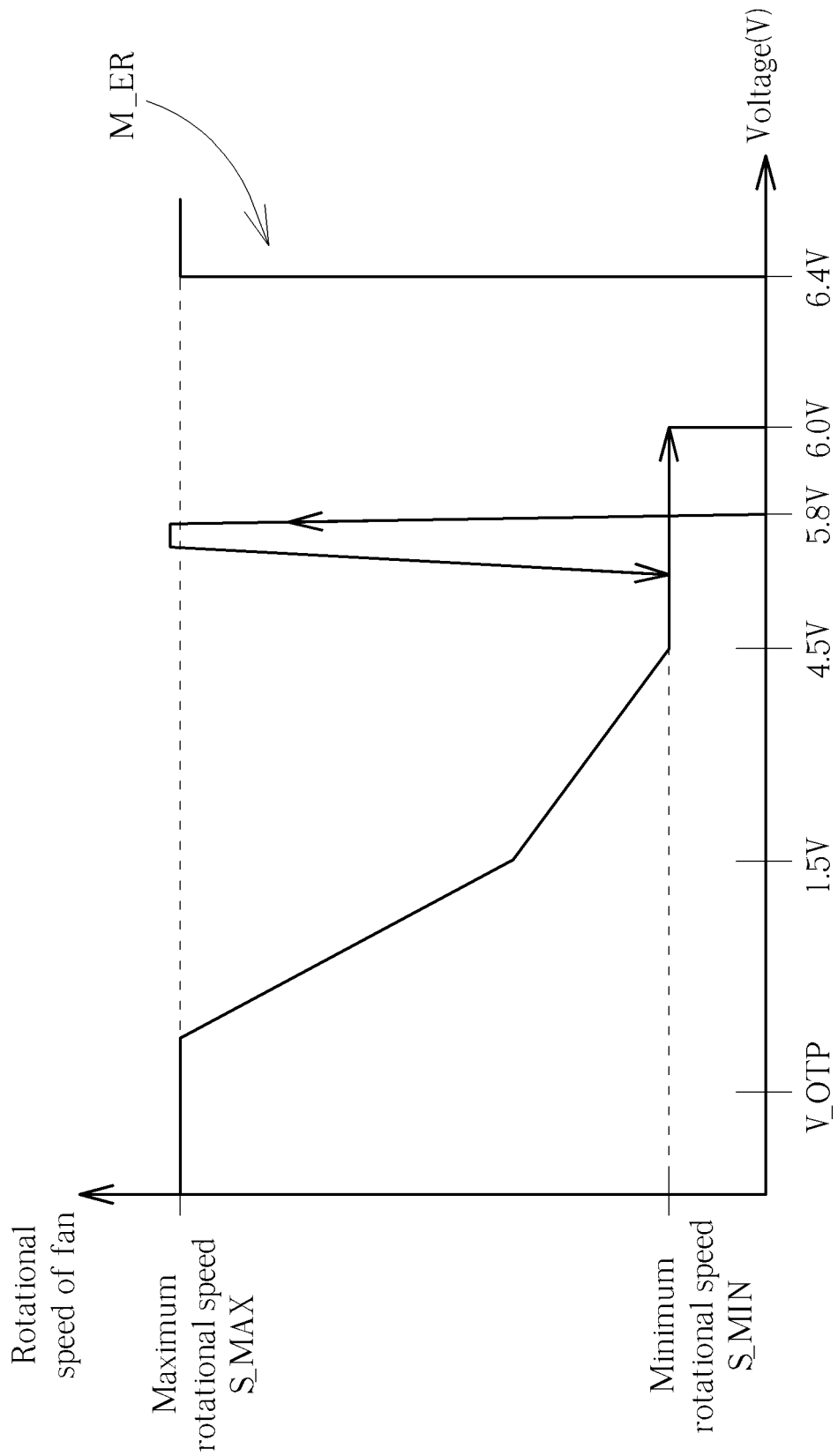
FIG. 8 illustrates a schematic diagram of temperature values versus rotational speeds of the motor driving circuit shown in FIG. 3 to drive the fan with a plurality of operational modes according to an embodiment of the invention.

Please refer to FIG. 8, which illustrates a schematic diagram of temperature values versus rotational speeds of the motor driving circuit 30 shown in FIG. 3 to drive the fan 12 with a plurality of operational modes according to an embodiment of the invention, wherein the X-axis represents the voltage values with the unit of volts (V), and the Y-axis represents the rotational speeds of the fan 12. Please refer to all FIG. 4, FIG. 5 and FIG. 8, the voltage values shown in FIG. 8 can be derived from the temperature values shown in FIG. 4, and particularly, the voltage values shown in FIG. 8 are formed as a horizontally symmetrical picture from the temperature values shown in FIG. 4. Under such circumstances, the driving circuit 30 can control the fan 12 to be operated in different operational modes according to changes of the voltage values, and the detailed operations can be referenced from FIG. 4, FIG. 5 and related paragraphs thereof, which is not descried hereinafter. Noticeably, the embodiment shown in FIG. 8 further comprises an overheated reference voltage V_OPT. When the feedback signal S_FB of the fan 12 is smaller than the overheated reference voltage V_OPT, the driving circuit 30 may be terminated to stop the rotational operation of the fan 12. Besides, when the voltage value exceeds 6.4 volts, the driving circuit 30 can also provide an error-proof mode M_ER for the fan 12. The error-proof mode may continuously initiate/terminate the rotational operation of the fan 12, such that the user can utilize the error-proof mode as an error detection mechanism, or utilize the error-proof mode as a protection mechanism while the fan 12 is operated in an extremely cold environment.

Figure 9:
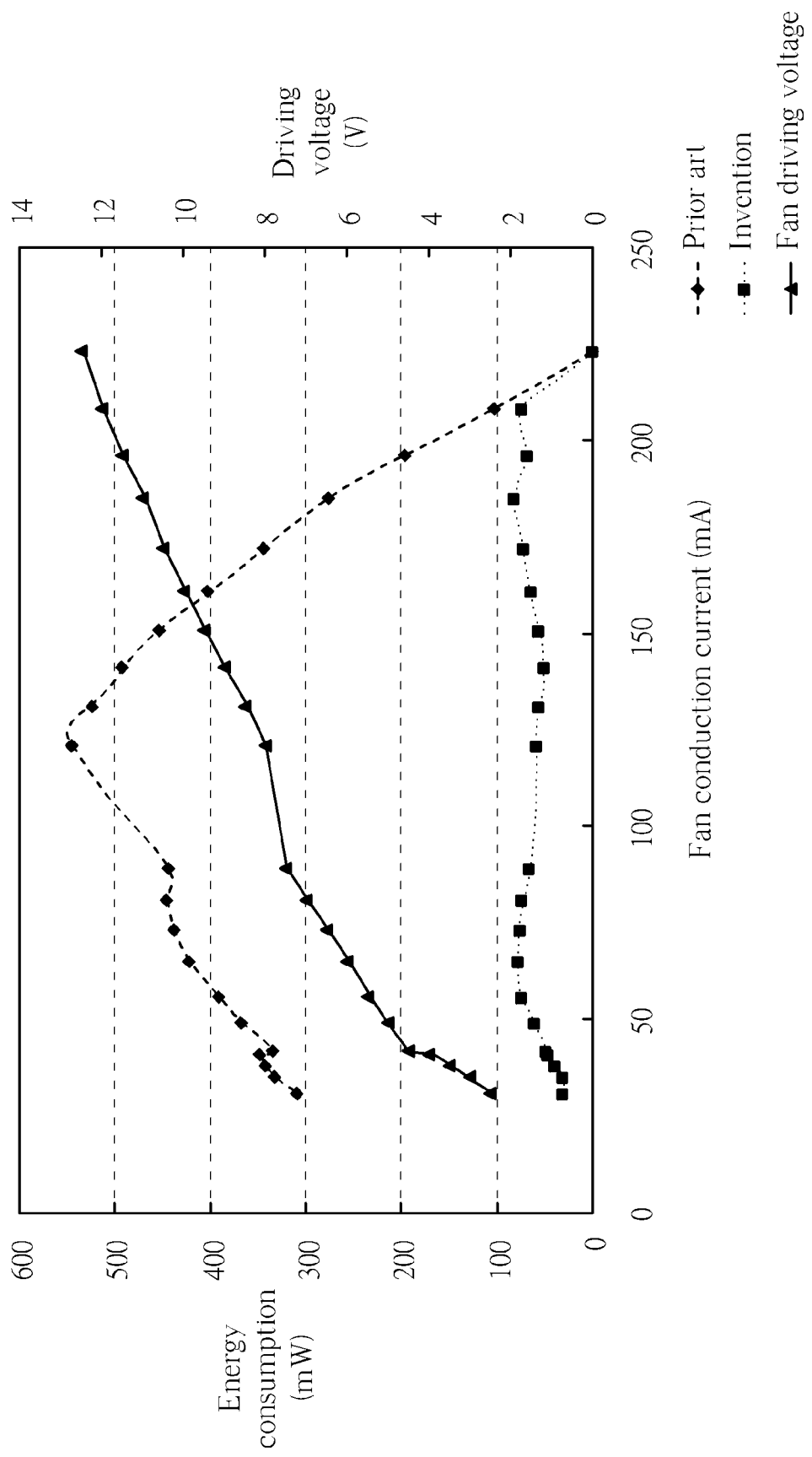
FIG. 9 illustrates a comparison schematic diagram of the invention and the prior art.

Please refer to FIG. 9, which illustrates a comparison schematic diagram of the invention and the prior art. In FIG. 9, the X-axis corresponds to a conduction current value of the fan 12 with the unit of micro Amperes (mA), the left of the Y-axis corresponds to an energy consumption during the rotational operation of the fan 12 with the unit of micro Watts (mW), and the right of the Y-axis corresponds to a voltage value for driving the fan 12 with the unit of Volts (V). As shown in FIG. 9, while the driving voltage for the fan 12 increases (corresponding to the solid line in the figure) to result in increasing of the conduction current as well, the prior art utilizes the linear voltage to drive the fan 12 for rotational operation (corresponding to the rhombus dotted line in the figure), and the invention utilizes the plurality of comparison parameters as well as the PFM technique to drive the fan 12 (corresponding to the square dotted line). Under such circumstances, the prior art uses a larger energy consumption than the invention, and the energy consumption difference between the prior and the invention is 500 mW while the conduction current is 100 mA, which influences the operation of the fan 12 with the unnecessary heat generation.

In comparison, the prior art only linearly increases/decreases the driving voltage via the input voltage VIN for linearly driving the fan 12 with the increasing/decreasing rotational speed. In the embodiment, the initiation module 300 pre-stores the plurality of reference temperature values or the plurality of reference voltage values corresponding to the plurality of operational modes and the control module 302 utilizes the PFM technique to compare the difference between the predetermined comparison signal S_PC and the feedback signal S_FB, such that the fan 12 can be switched between the plurality of operational modes for the rotational operation. Certainly, those skilled in the art can utilize the concept of the driving circuit 30 and the driving process 70 to be combined with a pulse width modulation (PWM) technique accompanying other logic comparison circuits and software/firmware, so as to adaptively switch the fan 12 between the PFM or PWM technique to match different requirements, which is also in the scope of the invention.

In summary, the embodiment of the invention provides a driving circuit and method for a fan. By pre-storing a plurality of reference temperature/voltage values corresponding to a plurality of operational modes, utilizing the pulse frequency modulation technique and a predetermined comparison signal, the embodiment of the invention compares a difference between a feedback signal and the predetermined comparison signal while the fan conducts, so as to switch the fan between the plurality of operational modes for a rotational operation and adaptively adjust energies passing through the fan. Accordingly, the rotational speed of the fan can be adjusted. In comparison with the prior art, the embodiment of the invention provides the non-linear transformed driving voltage to adjust the rotational operation of the fan for complying with different requirements and different loading/environmental conditions, so as to provide better energy conversion efficiency and broaden the application field of the driving circuit.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A driving circuit for driving a fan with a plurality of operational modes, the driving circuit comprising:
   an initiation module for generating a switch signal according to a feedback signal;
   a control module coupled to the initiation module for utilizing a pulse frequency modulation technique to generate a control signal according to the switch signal and a predetermined comparison signal, so as to drive the fan for a rotational operation; and
   a feedback module coupled to the fan for generating the feedback signal according to a conduction result of the fan;
   wherein the rotational operation comprises the plurality of operational modes corresponding to a plurality of adjustable driving voltage values, and the fan is triggered by a direct current (dc) voltage and is switched between the plurality of operational modes according to different conduction results of the fan.

2. The driving circuit of claim 1, wherein the initiation module further comprises a switch mode module pre-storing the plurality of operational modes to determine which one of the plurality of operational modes for the fan is operated according to the feedback signal.

3. The driving circuit of claim 1, wherein the initiation module further comprises a plurality of comparators, and each of the plurality of comparators correspond to one of the plurality of adjustable driving voltage values.

4. The driving circuit of claim 3, wherein each of the plurality of comparators compares the feedback signal and one of the plurality of adjustable driving voltage values, so as to generate the switch signal.

5. The driving circuit of claim 1, wherein the plurality of operational modes are a sleeping mode, an initiation mode, a first driving mode, a second driving mode and a high temperature protection mode.

6. The driving circuit of claim 5, wherein the fan corresponds to different rotational speeds while being operated under the initiation mode, the first driving mode and the second driving mode.

7. The driving circuit of claim 1, wherein the rotational operation further processes an error-proof mode before the fan is driven to rotate.

8. The driving circuit of claim 1, wherein the predetermined comparison signal is a limitation current parameter signal or a constant timing parameter signal.

9. The driving circuit of claim 8, wherein the control module further comprises a comparator for comparing the limitation current parameter signal, the constant timing parameter signal and the conduction result of the fan to generate the control signal.

10. The driving circuit of claim 1, further comprising a voltage modulation module coupled to the initiation module and the control module for receiving an input voltage.

11. The driving circuit of claim 1, further comprising a switch transistor for controlling the conduction result of the switch transistor according to the control signal.

12. The driving circuit of claim 11, further comprising a voltage transformation module coupled to the fan and the switch transistor for processing the rotational operation of the fan according to the conduction result of the switch transistor.

13. A driving method for utilizing a driving circuit to drive a fan with a plurality of operational modes, the driving method comprising:
   generating a switch signal according to a feedback signal;
   utilizing a pulse frequency modulation technique to generate a control signal according to the switch signal and a predetermined comparison signal, so as to drive the fan for a rotational operation; and
   generating the feedback signal according to a conduction result of the fan;
   wherein the rotational operation comprises the plurality of operational modes corresponding to a plurality of adjustable driving voltage values, and the fan is triggered by a direct current (dc) voltage and is switched between the plurality of operational modes according to different conduction results of the fan.

14. The driving method of claim 13, further comprising utilizing a switch mode module to pre-store the plurality of operational modes for determining which one of the plurality of operational modes for the fan is operated according to the feedback signal.

15. The driving method of claim 13, further comprising utilizing a plurality of comparators corresponding to the plurality of adjustable driving voltage values, and each of the plurality of comparators compares the feedback signal and one of the plurality of adjustable driving voltage values, so as to generate the switch signal.

16. The driving method of claim 13, wherein the plurality of operational modes are a sleeping mode, an initiation mode, a first driving mode, a second driving mode and a high temperature protection mode.

17. The driving method of claim 13, wherein the fan corresponds to different rotational speeds while being operated under the initiation mode, the first driving mode and the second driving mode.

18. The driving method of claim 13, wherein the rotational operation further processes an error-proof mode before the fan is driven to rotate.

19. The driving method of claim 13, wherein the predetermined comparison signal is a limitation current parameter signal or a constant timing parameter signal.

20. The driving method of claim 19, further comprising comparing the limitation current parameter signal, the constant timing parameter signal and the conduction result of the fan to generate the control signal.

21. The driving method of claim 13, further comprising controlling the conduction result of a switch transistor according to the control signal.

22. The driving method of claim 21, further comprising processing the rotational operation of the fan according to the conduction result of the switch transistor and a voltage transformation module.

* * * * *